(12) United States Patent
Jung

(10) Patent No.: US 8,207,655 B2
(45) Date of Patent: Jun. 26, 2012

(54) SPINDLE MOTOR

(75) Inventor: Hee Chul Jung, Gyeonggi-do (KR)

(73) Assignee: LG Innotek Co., Ltd., Seoul (KR)

( * ) Notice: Subject to any disclaimer, the term of this patent is extended or adjusted under 35 U.S.C. 154(b) by 333 days.

(21) Appl. No.: 12/698,770

(22) Filed: Feb. 2, 2010

(65) Prior Publication Data

US 2010/0194250 A1 Aug. 5, 2010

(30) Foreign Application Priority Data

Feb. 3, 2009 (KR) ........................ 10-2009-0008408

(51) Int. Cl.
*H02K 5/16* (2006.01)
(52) U.S. Cl. ...................... 310/425; 310/67 R
(58) Field of Classification Search ................ 310/67 R, 310/90, 425
See application file for complete search history.

(56) References Cited

U.S. PATENT DOCUMENTS

| 5,343,104 | A * | 8/1994 | Takahashi et al. ............. 310/90 |
| 6,339,273 | B1 * | 1/2002 | Higuchi .......................... 310/91 |
| 7,224,092 | B2 * | 5/2007 | Masuda et al. .............. 310/67 R |
| 7,402,928 | B2 * | 7/2008 | Hyun .............................. 310/90 |
| 7,520,674 | B2 * | 4/2009 | Nakamiya et al. ............ 384/100 |
| 8,115,357 | B2 * | 2/2012 | Smirnov et al. ................. 310/90 |
| 2002/0074879 | A1 * | 6/2002 | Jun ................................. 310/90 |
| 2002/0117911 | A1 * | 8/2002 | Fukutani ..................... 310/67 R |
| 2003/0102742 | A1 * | 6/2003 | Nozaki et al. ................... 310/90 |
| 2007/0007836 | A1 * | 1/2007 | Hyun ............................ 310/90 |

* cited by examiner

*Primary Examiner* — Thanh Lam
(74) *Attorney, Agent, or Firm* — Saliwanchik, Lloyd & Eisenschenk

(57) ABSTRACT

A spindle motor is disclosed, whereby a bearing is fixed at a support portion of a base to dispense with a bearing housing, thereby reducing the number of parts, shortening an assembly process and reducing the manufacturing cost. Furthermore, the bearing is fixedly inserted into the support portion integrally formed with the base to allow the bearing to maintain a perpendicularity relative to the base, whereby a rotation shaft supported by the bearing can maintain a perpendicularity, thereby reducing noise and vibration.

15 Claims, 2 Drawing Sheets

SPINDLE MOTOR

CROSS-REFERENCE TO RELATED APPLICATION

This application claims the benefit under 35 U.S.C. §119 of Korean Application No. 10-2009-0008408, filed Feb. 3, 2009, which is hereby incorporated by reference in its entirety.

BACKGROUND

A spindle motor performs the function of rotating a disk to enable an optical pickup which linearly reciprocates in an optical disk drive (ODD) to read data recorded on the disk.

FIG. 1 is a cross-sectional view of the conventional spindle motor. Referring to FIG. 1, an assembly process of a spindle motor is such that a base 11 is supportively coupled with upper/bottom-opened bearing housing 13. An outer bottom end of the bearing housing 13 is coupled to the base 11 by caulking, and an inner bottom end of the bearing housing 13 is coupled to a thrust stopper 15 by caulking.

A bearing 17 is coupled to an interior of the bearing housing 13, and the bearing 17 is rotatably supported by a rotation shaft 19. An outer surface of the bearing housing 13 is mounted with a core 21 and a stator having a coil 22. The rotation shaft 19 is coupled with a rotor yoke 25 and a rotor having a magnet 26.

In a case the coil 22 is applied with a current, the rotor is rotated by the electromagnetic force generated between the coil 22 and the magnet 26, whereby a disk 50 mounted on the rotor yoke 25 is rotated.

The spindle motor thus described suffers from a disadvantage in that a work process is complicated to increase the manufacturing cost because the base 11 and the bearing housing 13, and the bearing housing 13 and the thrust stopper 15 are mutually coupled by caulking 13a, 13b. The conventional spindle motor also suffers from a disadvantage in that a bearing housing 13 made of high priced brass is separately needed to further increase the manufacturing cost. The conventional spindle motor still suffers from a disadvantage in that the rotation shaft 19 installed inside the bearing housing 13 may tilt relative to the base 11 because perpendicularity of the bearing housing 13 relative to the base 11 is deviated during caulking 13a process of the bearing housing 13, resulting in generation of noise and vibration.

BRIEF SUMMARY

An object of the present invention is to obviate the above-mentioned problems, and it is an object to provide a spindle motor configured to improve a coupling structure between a base and a bearing housing, thereby promoting a reduced number of parts, a reduced assembly process and an improved perpendicularity and assemblage.

Additional advantages, objects, and features of the disclosure will be set forth in part in the description which follows and in part will become apparent to those having ordinary skill in the art upon examination of the following or may be learned from practice of the disclosure. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a spindle motor according to some exemplary embodiment of the present disclosure may comprise: a base from which a support portion is protruded; a thrust stopper coupled to the base for airtightly sealing one side of the support portion; a bearing fixed at an inner circumferential surface of the support portion; a rotation shaft rotatably and supportively installed at one periphery and a distal end thereof to an inner circumferential surface of the bearing and the thrust stopper; a stator fixed at a periphery of the support portion; and a rotor coupled to a portion of the rotation shaft exposed to the other side of the support portion, and rotating in association with the stator to rotate the rotation shaft.

DETAILED DESCRIPTION

A spindle motor according to an exemplary embodiment of the present invention will be described in detail with reference to the accompanying drawings.

Figure 1:
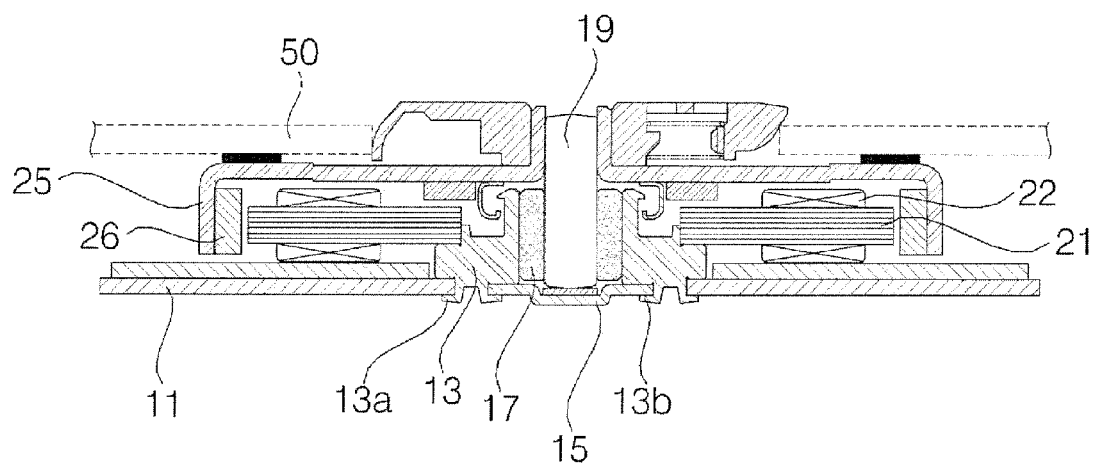
FIG. 1 is a cross-sectional view of the conventional spindle motor.
Figure 2:
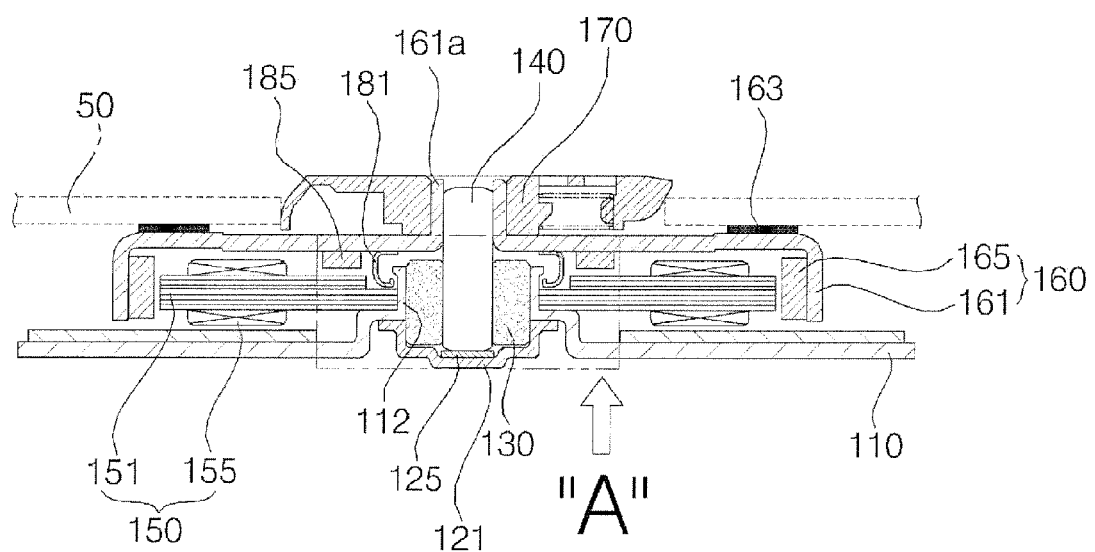
FIG. 2 is a cross-sectional view illustrating a spindle motor according to an exemplary embodiment of the present invention.
Figure 3:
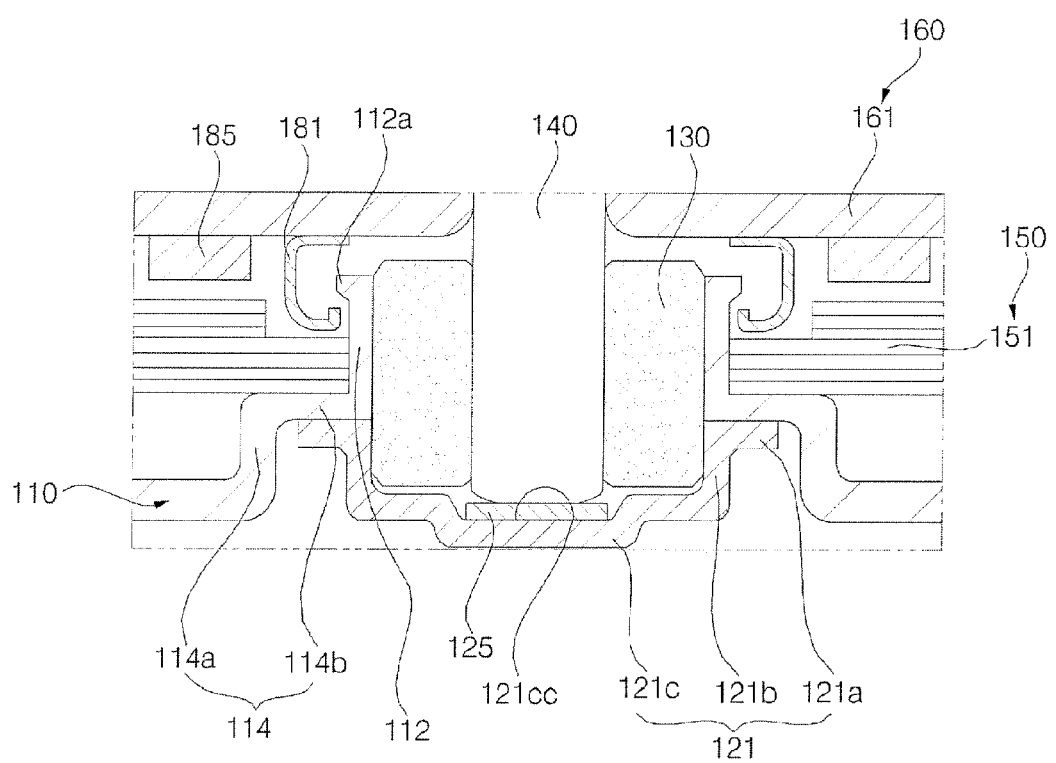
FIG. 3 is an enlarged view of "A" part of FIG. 2.

FIG. 2 is a cross-sectional view illustrating a spindle motor according to an exemplary embodiment of the present invention, and FIG. 3 is an enlarged view of "A" part of FIG. 2.

As illustrated, a spindle motor according to the present invention is installed with a base 110. In designating a direction and a surface of constituent parts including the base 110, a direction and a surface facing an upper vertical side of the base 110 are respectively called "an upper side" and "an upper surface", while a direction and a surface facing a bottom vertical side of the base are respectively called "a bottom side" and "a bottom surface". A stator is provided at an upper surface of the base 110.

The base 110 is coupled with a thrust stopper 121 airtightly sealing a bottom surface of a support portion 112 by welding or adhesive. The thrust stopper 121 supports a bottom end of a rotation shaft 140 to prevent the rotation shaft 140 from disengaging downwards.

A part of the base 110 contacting the bottom surface of the support portion 112 is bent or formed with a bending portion 114. The bending portion 114 includes a first bending portion 114a perpendicularly erected on the base 110 and a second bending portion 114b bent from an upper end of the first bending portion 114a to be integrally connected to a bottom surface of the support portion 112 in parallel with the base 110. Strength at the base 110 outside of the support portion 112 is improved by the bending portion 114.

A thrust stopper 121 includes a ring-shaped coupling frame 121a coupled to a bottom surface of the second bending portion 141b contacting the bottom surface of the support portion 112, a vertical extension pipe 121b extended downward from an inner circumferential surface of the coupling frame 121a, and a sealing plate 121c airtightly sealing a bottom surface of the vertical extension pipe 121b to support a bottom end of the rotation shaft 140.

A bottom periphery of a bearing 130 may be exposed to a bottom side of the support portion 112 to be fixed at an inner circumferential surface of the vertical extension pipe 121b of the thrust stopper 121. To this end, the support portion 112 and the vertical extension pipe 121b are formed with the same internal diameter to form a concentricity.

A thrust plate 125 where a bottom end of the rotation shaft 140 is supportively contacted is interposed between the bottom end of the rotation shaft 140 and a sealing plate 121c of the thrust stopper 121. The thrust plate 125 inhibits the rotation shaft 140 and the thrust stopper 121 from being worn and torn, and simultaneously facilitates the rotation of the rotation shaft 140. The thrust plate 125 is insertedly accommodated in a concave groove 121c formed at the sealing plate 121c.

The support portion 112 is installed with a stator 150. The stator 150 includes a core 151 insertedly fixed at a periphery of the support portion 112 and a coil 155 wound on the core 151. A bottom surface of the core 151 of the core 151 facing the base 110 side supportively contacts an upper surface of the second bending portion 114b of the base 110. As a result, the core 151 is securely fixed at the support portion 112.

An upper periphery of the rotation shaft 140 exposed toward the support portion 112 is coupled with a rotor 160. The rotor 160 has a bottom-opened cylindrical shape, is coupled at an upper surface thereof to the periphery of the rotation shaft 140 and is coupled at a lateral surface thereof to a lateral inner circumferential surface of the rotation shaft 140 and the rotor yoke 161 encompassing the stator 150 to have a magnet 165 that is opposite to the stator 150. A disk 150 is mounted on the rotor yoke 161.

In a case a current is applied to the coil 155, the rotor 160 is rotated by the electromagnetic force generated by the stator 150 and the rotor 160 to thereby rotate the rotation shaft 140.

The spindle motor according to the present invention can reduce the number of parts due to no need of bearing housing for bearing 130. The spindle motor according to the present invention can reduce a process of coupling the bearing housing to other parts, and therefore can obviate problems generated in the course of coupling the bearing housing to other parts.

An upper central side of the rotor yoke 161 is formed with a coupling pipe 161a for securely coupling the rotor yoke 161 to the rotation shaft 140 by enlarging a coupled area with the rotation shaft 140, and a periphery of the coupling pipe 161a is coupled with a clamp device 170 supporting the disk 150 mounted on the rotor yoke 161.

The rotor yoke 161 is coupled to an upper side of a stopper 181. A bottom side of the stopper 181 is hitched by a hitching frame 112a formed at an upper periphery of the support portion 112 to prevent the rotor 160 and the rotation shaft 140 from being disengaged upwards.

An upper circumferential surface of the core 151 facing the upper end of the rotation shaft 140 is positioned at an outside of stopper 181, and a bottom end of the stopper 181 is inserted between an upper inner circumferential surface of the core 151 and a periphery of the support portion 112, the configuration of which is to thin the spindle motor by reducing an installation space of the stopper 181.

The rotor yoke 161 is coupled with a suction magnet 185. The suction magnet 185 prevents the rotor 160 and the rotation shaft 140 from floating upwards when the rotor 160 and the rotation shaft 140 rotate. The suction magnet 185 may be coupled to the core 151 of the stator 150. Unexplained reference numeral 163 is a felt for preventing slippage of the disk 150.

While the present disclosure has been particularly shown and described with reference to exemplary embodiments thereof, the general inventive concept is not limited to the above-described embodiments. It will be understood by those of ordinary skill in the art that various changes and variations in faun and details may be made therein without departing from the spirit and scope of the present invention as defined by the following claims.

The spindle motor according to the present invention is advantageous in that a bearing is fixed at a support portion of a base to dispense with a bearing housing, thereby reducing the number of parts, shortening an assembly process and reducing the manufacturing cost. Furthermore, the bearing is fixedly inserted into the support portion integrally formed with the base to allow the bearing to maintain a perpendicularity relative to the base, whereby a rotation shaft supported by the bearing can maintain a perpendicularity, thereby reducing noise and vibration.

While the present disclosure has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

What is claimed is:

1. A spindle motor, comprising:
a base from which a support portion is protruded;
a thrust stopper coupled to the base for airtightly sealing one side of the support portion;
a bearing fixed at an inner circumferential surface of the support portion;
a rotation shaft rotatably and supportively installed at one periphery and a distal end thereof to an inner circumferential surface of the bearing and the thrust stopper;
a stator fixed at a periphery of the support portion; and
a rotor coupled to a portion of the rotation shaft exposed to the other side of the support portion, and rotating in association with the stator to rotate the rotation shaft.

2. The spindle motor claim 1, wherein a part of the base contacting a cross section of the support portion is bent to form a bending portion.

3. The spindle motor claim 2, wherein the bending portion includes a first bending portion perpendicularly erected on the base and a second bending portion bent from an upper end of the first bending portion to be integrally connected to a bottom surface of the support portion in parallel with the base.

4. The spindle motor claim 3, wherein a surface of the stator facing the base side is supportively contacted by the second bending portion.

5. The spindle motor claim 1, wherein one side of the bearing is exposed to one side of the support portion to allow a periphery to be fixed at an inner circumferential surface of the thrust stopper.

6. The spindle motor claim 5, wherein the thrust stopper includes a ring-shaped coupling frame coupled to a bottom surface of a second bending portion contacting the bottom surface of the support portion, a vertical extension pipe extended downward from an inner circumferential surface of the coupling frame, and a sealing plate airtightly sealing a bottom surface of the vertical extension pipe to support a bottom end of the rotation shaft.

7. The spindle motor claim 1, characterized in that a bent portion of the base continuously repeats the slantness and verticality to the base.

8. The spindle motor claim 6, wherein the support portion and the vertical extension pipe have the same size of internal diameter.

9. The spindle motor claim 8, wherein the sealing plate is formed with a concave groove into which the thrust stopper is insertedly accommodated.

10. The spindle motor claim 1, wherein the stator is coupled with a stopper preventing the rotor and the rotation shaft from being disengaged toward the other side of the support portion by being hitched at one side of the support.

11. The spindle motor claim 10, wherein a periphery at the other side of the support portion is formed with a hitching frame at which the stopper is hitched.

12. The spindle motor claim 11, wherein an upper circumferential surface of a core facing the other side of the rotation shaft is positioned at an outside of stopper, and a bottom end of the stopper is inserted between an upper inner circumferential surface of the stator and a periphery of the stopper.

13. The spindle motor claim 12, wherein the stator includes a core fixed at a periphery of the support portion and a coil wound on the core, and wherein an inner circumferential surface of the core facing the other side of the rotation shaft is positioned outside of the stopper.

14. The spindle motor claim 1, wherein a suction magnet is formed at a part of at least the rotor and the stator for inhibiting the rotor and the rotation shaft from floating upwards.

15. The spindle motor claim 1, wherein a part of the rotor coupled to the rotation shaft is coupled to a clamp device supporting the disk mounted on the rotor.

* * * * *